United States Patent [19]
Budd et al.

[11] Patent Number: 5,896,232
[45] Date of Patent: Apr. 20, 1999

[54] HIGHLY EFFICIENT AND COMPACT FRONTLIGHTING FOR POLARIZATION-BASED REFLECTION LIGHT VALVES

[75] Inventors: Russell Alan Budd, North Salem; Fuad Elias Doany, Katonah, both of N.Y.; Rama Nand Singh, Bethel, Conn.

[73] Assignee: International Business Machines Corporation, Armonk, N.Y.

[21] Appl. No.: 08/908,394

[22] Filed: Aug. 7, 1997

[51] Int. Cl.$^6$ .................... G02B 27/10; G02B 27/14
[52] U.S. Cl. .................... 359/630; 359/619; 359/627
[58] Field of Search .................... 359/630, 619, 359/627; 349/117; 348/57, 58

[56] References Cited

U.S. PATENT DOCUMENTS

| | | | |
|---|---|---|---|
| 3,858,001 | 12/1974 | Bonne | 348/57 |
| 4,012,116 | 3/1977 | Yevick | 359/619 |
| 4,111,695 | 9/1978 | Yevick | 359/619 |
| 5,096,520 | 3/1992 | Faris | 156/99 |
| 5,275,538 | 1/1994 | Monji et al. | 359/40 |
| 5,537,144 | 7/1996 | Faris | 348/58 |

*Primary Examiner*—Georgia Epps
*Assistant Examiner*—Ricky Mack
*Attorney, Agent, or Firm*—Scully, Scott, Murphy & Presser; David M. Shofi

[57] ABSTRACT

An optical device and a display are disclosed that include an illumination source which provides unpolarized light. An array of polarizing plates have an entrance surface, which receives the unpolarized light at an oblique angle, and an exit surface which provides a polarized light having a first polarization and exiting the array at a substantially perpendicular direction to the exit surface. A light valve selectively rotates the polarized light to form an image forming light, and an imaging lens receives the image forming light and forms an image. Each of the polarizing plates in the array has opposing surfaces that are tilted relative to its entrance and exit surfaces. Each polarizing plate includes a polarizing layer formed on one of the opposing tilted surfaces, and a half-wave optical retardation layer formed on the polarizing layer.

27 Claims, 11 Drawing Sheets

HIGHLY EFFICIENT AND COMPACT FRONTLIGHTING FOR POLARIZATION-BASED REFLECTION LIGHT VALVES

BACKGROUND OF THE INVENTION

1. Field of the Invention

The present invention is directed to an optical system for illuminating and imaging a reflective light valve, and more particularly, to systems having compact, lightweight, and efficient frontlighting for polarization-based reflective light valves and backlighting for transmissive light valves used, for example, in miniature displays.

2. Discussion of the Prior Art

Typically, conventional miniature displays, such as head mounted displays (HMDs), are based on miniature cathode ray tube (CRT) or transmission-based liquid crystal light valve technology. The CRT-based systems are bulky, expensive, and heavy, and primarily used for military helmet-mounted applications. This technology is not suitable for lightweight, compact personal displays.

Transmission-based liquid crystal (LC) technology is the preferred technology for these portable miniature displays today. Although appropriate for the low resolution displays currently available, such as 640×480 pixels, this transmission-based LC technology is not adequate for high resolution miniature portable displays.

A transmission technology based display requires a clear aperture for transmission of light through the display. A transparent substrate is also required which incorporates all the display driving circuitry (such as active matrix circuitry). Typically, the driving circuitry uses amorphous silicon on glass technology or poly-silicon on quartz technology. The requirements of transparent substrate, clear aperture, and display control circuitry limit the minimum size of the display panel, thus preventing further display size reductions. To achieve smaller size display panels, reflective liquid crystal (LC) light valves are used.

Reflective liquid crystal light valves do not have the size limitation of transmission-based LC light valves. For reflective LC light valves, using crystalline silicon CMOS technology, the active matrix driving circuitry can be fabricated on 10 micron pixel dimensions or smaller. Furthermore, by using reflection liquid crystal devices, the requirement for a clear aperture in the display panel, needed for transmissive LC devices, is dispensed with. Instead, the reflective device incorporates a mirror array that is fabricated over the underlying CMOS circuitry. In this case, the entire surface of the device is available for display aperture. Thus, the pixel size is only limited by the CMOS technology required to fabricate the drive circuitry, which today is less than 10 microns per pixel. The functioning reflective display panel is completed when the liquid crystal and top glass are assembled over the mirror array. Thus, miniature high resolution displays can be fabricated using silicon-based reflection liquid crystal devices. However, reflection-based light valves, such as liquid crystal (LC) spatial light modulators (SLMs) have complex illumination requirements. In the reflection mode, the SLM must be illuminated and imaged from the same side. A simple backlight structure typically used in transmission-based displays is not directly applicable for reflective SLMs.

The illumination system provides normal incident illumination onto the SLM. This requirement causes the illumination system for both reflective and transmissive SLMs to increase the size and thickness of the display. Accordingly, there is a need for an SLM illumination system that is compact, yet highly efficient.

SUMMARY OF THE INVENTION

The object of the present invention is to provide an optical device that eliminates the problems of conventional optical systems.

Another object of the present invention is to provide a compact, lightweight, and efficient optical device for illuminating and imaging miniature displays, for example.

Yet another object of the present invention is to provide an optical device that has a reduced thickness.

These and other objects of the present invention are achieved by an optical device and a display that include an illumination source which provides unpolarized light. An array of polarizing plates has an entrance surface, which receives the unpolarized light at an oblique angle, and an exit surface which provides a polarized light having a first polarization and exiting the array at a substantially perpendicular direction to the exit surface. A light valve selectively rotates the polarized light to form an image forming light, and an imaging lens receives the image forming light and forms an image.

Each of the polarizing plates in the array has opposing surfaces that are tilted relative to its entrance and exit surfaces. Each polarizing plate includes a polarizing layer formed on one of the opposing tilted surfaces, and a half-wave optical retardation layer formed on the polarizing layer. Illustratively, the opposing tilted surfaces are tilted at an angle of substantially 30°, where the tilt angle is between an axis, which is perpendicular to the entrance and exit surfaces, and the opposing surface. For example, the length of the tilted surface is substantially twice a length of the exit surface; the cross-section of the polarizing plate is a parallelogram; and the distance between the entrance and exit surfaces is approximately 2 mm.

The area of the array of polarizing plates matches an area of a light valve or spatial light modulator that rotates the polarized light into an image forming light. The spatial light modulator is a transmissive or a reflective spatial light modulator.

The unpolarized light is provided by a light source, which may be an arc lamp, a white light emitting diode, or a cold cathode fluorescent light tube, for example. A collimating lens may be located between the light source and the entrance surface to collimate the unpolarized light incident on the entrance surface.

A polarizer receives said image forming light and outputs a cleaned-up image forming light for improving contrast of the viewed image, which is formed on a screen for example. An imaging lens that images the image forming light for viewing is also includes.

In one embodiment, the imaging lens is replaced by a beam splitter that passes one portion of the image forming light and reflects another portion thereof; and a mirror that reflects this one portion of the image forming light passed by the beam splitter back to the beam splitter. The beam splitter reflects a portion of the light received from the mirror toward a viewer.

In another embodiment that provides color images, many polarizing plate arrays are used for receiving a different color component of the unpolarized light and providing a different color component of a polarized light. Dichroic mirrors separate a white unpolarized light into the different color components of the unpolarized light. For example, three polarizing plate arrays are used for the red, green and blue components of light, and three light valves are provided. Each light valve forms a different color image forming light from a respective one of the different color components of the polarized light. A dichroic prism recombines the different color components of the image forming light, and a projection lens projects the combined image forming light onto a screen.

In yet another embodiment, a prism is located over the entrance surface, wherein a refraction index of the prism is substantially equal to a refraction index of the polarizing plate array. The prism may have various configurations. For example, the prism has a surface that receives the unpolarized light at a normal direction thereto, and the unpolarized light continues to the entrance surface for incidence thereon at the oblique angle.

Alternatively, the prism has a surface that receives unpolarized illumination at a normal direction thereto, which is parallel to the entrance surface, and a tilted surface that reflects the unpolarized illumination to provide the unpolarized light to the entrance surface for incidence thereon at the oblique angle.

The tilt angle between the prism tilted surface and the entrance surface allows total internal reflection of the unpolarized illumination to provide the unpolarized light to the entrance surface for incidence thereon at the oblique angle.

Upon reflection from a reflective light valve that reflects the image forming light and a dark pixel light, the tilted surface allows total internal reflection of the dark pixel light in a direction opposite and parallel to the unpolarized illumination. Unlike the reflected dark pixel light, the image forming light passes through the tilted surface. If desired, a complementary prism having a tilted surface that complements and is located over the prism tilted surface is provided.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
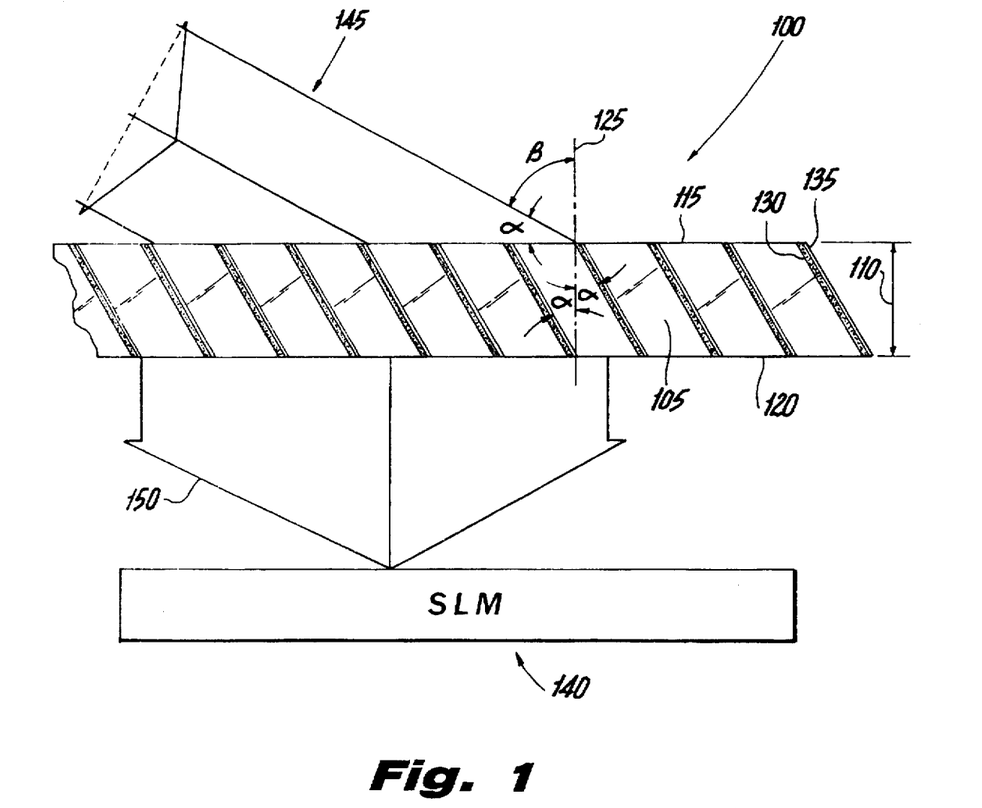
FIG. 1 shows a polarizing plate array or strip polarizing beam splitter (strip-PBS) according to one embodiment of the present invention.

FIG. 1 shows an optical structure 100 made from several individual sub-components or polarizing plates 105, e.g. glass or plastic mirrors with a polarizing coating, which are arranged in an array that forms a window, such as a glass or plastic window having a thickness 110 of a few millimeters (mm), e.g., approximately 2 mm. This window 100 converts light incident on a first or entrance surface 115 at an oblique angle into polarized light exiting approximately or substantially normal to a second or exit surface 120, which is opposite and parallel to the entrance surface 115, for example. Illustratively, the polarized light exiting approximately normal to the exit surface 120 has an s-polarization. The window 100 is optically transparent for one polarization of light, e.g., the p-polarization. A p-polarized light, e.g., in a direction approximately normal to the window surfaces 115, 120, is used for imaging of a light valve or SLM 140 as will be described in connection with FIG. 4.

The polarizing plates 105 have opposing side surfaces that are tilted by a tilt angle a from an axis 125 which is perpendicular to the window entrance and exit surfaces 115, 120. Illustratively, the tilt angle $\alpha$ is substantially 30°. The individual polarizing plates 105 are identical to each other and have a cross-sectional shape which is a parallelogram, for example.

A polarizing multi-layer optical coating 130 is formed on one of the larger surfaces of the parallelogram, which is one of the side surfaces of the polarizing plate 105. Illustratively, the polarizing coating 130 separates unpolarized light into s and p polarizations, where the s-polarization is reflected and the p-polarization is transmitted. A half-wave optical retardation film 135, such as a polymeric thin film, is then formed, e.g., laminated, over the polarizing coating 130.

Figure 2:
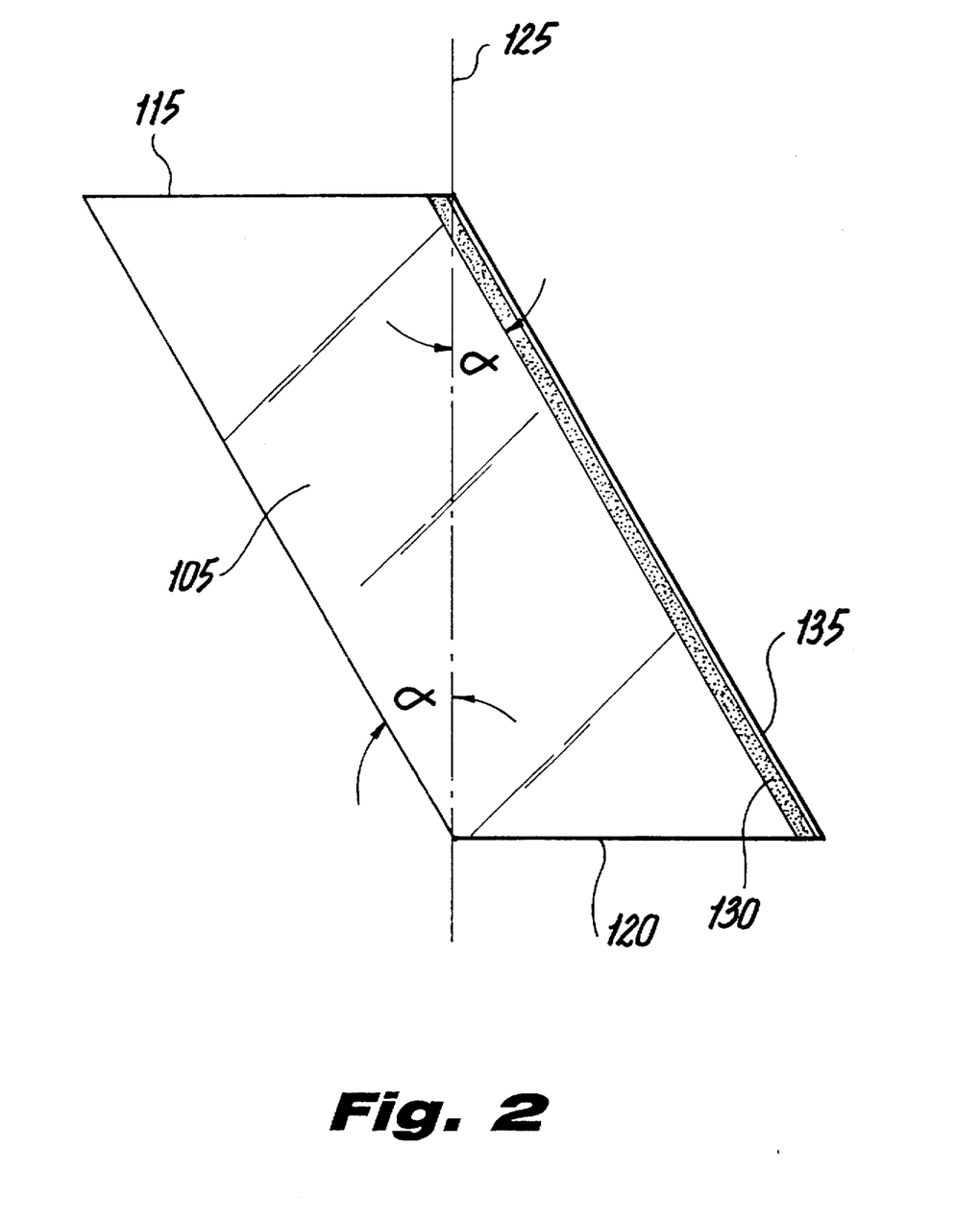
FIG. 2 shows a cross sectional view of one polarizing plate of the strip-PBS shown in FIG. 1 according to the present invention.

FIG. 2 shows a cross-sectional view of an individual polarizing plate 105. The larger sides of the parallelogram are substantially twice the shorter sides. This is equivalent to two 30–60–90 angle triangles placed back-to-back to form the parallelogram. It is noteworthy that the 30 degree tilt angle $\alpha$ and the larger parallelogram sides being twice the shorter sides are important as they allow s-polarized light, for example, to emerge uniformly from, and perpendicular to, the exit surface 120, as will be described in greater detail in connection with FIG. 3.

The exact cross-sectional size of each polarizing plate 105 is not critical, but will influence the total number of polarizing plates 105 required and the thickness of the window 100. A total thickness 110 of about 2 mm is a reasonable goal. The total number of polarizing plates 105 is determined by the cross-sectional size of the polarizing plates 105, and the overall size of a light valve or spatial light modulator (SLM) 140 over which the window 100 is placed. The SLM 140 receives the s-polarized light from the exit surface 120 of the window 100, and selectively rotates this light to form an image forming light.

The length of each polarizing plate 105 is determined by the size of the light valve 140. Several polarizing plates 105 are then laminated together to produce the window 100 of approximately 2 mm in thickness, having a length and a width that match the size of the light valve 140, for example, having an area of a few cm². The final structure of this window 100 is a slab of strips of polarizing beam splitters (PBSs) 130 and half-wave plates 135, also referred to as a strip-PBS array 100.

As shown in FIG. 1, an unpolarized light 145 is introduced to one window surface, e.g., the entrance surface 115, at an incident angle $\alpha$, where angle $\alpha$ is substantially 30°, or at an angle $\beta$ equaling substantially 60 degrees from the array normal 125. The window or strip-PBS array 100 enables the unpolarized light 145 to emerge normal to the other surface, e.g., the exit surface 120, as a polarized light 150. For example, the emerging polarized light 150 has s-polarization.

Figure 3:
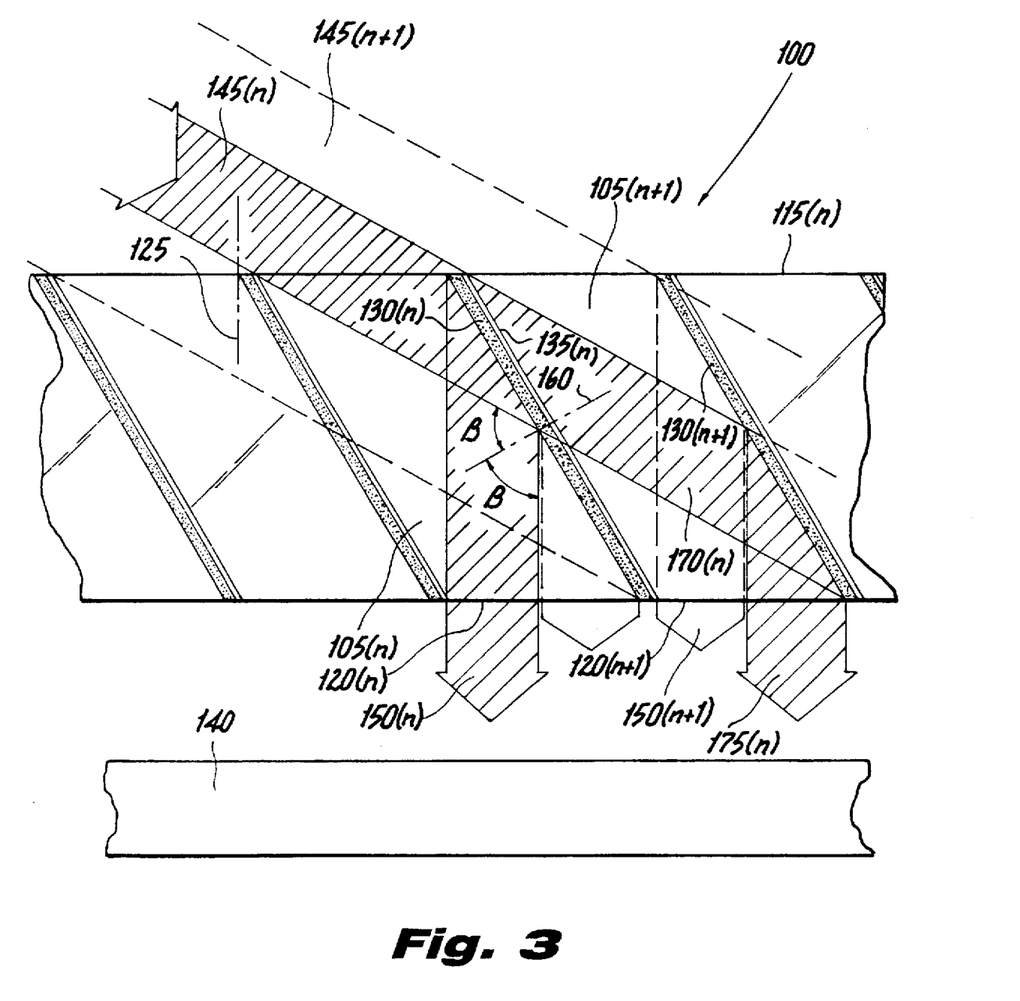
FIG. 3 shows an expanded view of the strip-PBS shown in FIG. 1 used with a reflective light valve according to the present invention.

FIG. 3 shows an expanded view of two polarizing plates 105 of the strip-PBS 100, for example, a first polarizing plate 105(n) and a second polarizing plate 105(n+1), which is adjacent to the first polarizing plate 105(n). An unpolarized light beam 145(n) is incident onto the entrance surface 115(n) of the first polarizing plate 105(n). Examining this light beam 145(n) shows that it impinges onto the top half of the PBS coating 130(n) of the first polarizing plate 105(n). Illustratively, the polarizing layer PBS coating 130(n) separates the unpolarized light 145(n) into s and p polarization, where the s-polarization is reflected and the p-polarization is transmitted.

A first angle $\beta_1$ between the unpolarized light 145(n) and an axis 160 which is perpendicular to the tilted PBS coating 135(n) is 60 degrees. The s-polarization of light 150(n) reflected by the PBS coating 135(n) emerges at a second angle $\beta_2$ of 60 degrees, which is between the PBS coating 135(n) and the axis 160 normal thereto, on the side of the normal axis 160 opposite to the first angle $\beta_1$. That is, the s-polarized reflected light 150(n) is 120° from the unpolarized light 145(n) incident on the top half of the PBS coating 135(n). The direction of the s-polarized reflected light 150 (n) is also perpendicular to the overall strip-PBS array 100, i.e., parallel to the array normal axis 125.

Although all the s-polarized reflected light 150(n) emerges normal to the polarizing plate exit surface 120(n), it does not cover the entire exit surface 120(n) of the polarizing plate 105(n). The s-polarized reflected light 150 (n), which is reflected from the top half of the PBS coating 130(n) only covers 50% or the near half of the exit surface 120(n), where the near half is the half of the exit surface 120(n) nearest the unpolarized light 145(n) or nearest a light source that provides the unpolarized light 145. Extrapolating to the entire exit surface 120 of the strip-PBS 100, the s-polarized reflected light 150, which is reflected from the top halves of the PBS coatings 130 of each polarizing plate 105, only covers 50%, or alternating near halves, of the exit surface 120 of the strip-PBS array 100.

The other or far halves of the exit surface 120 of the strip-PBS 100 are covered by s-polarized light reflected from the bottom halves of the PBS coatings 130 of each polarizing plate 105, which s-polarized light results from p-polarized light transmitted through the PBS top halves and converted to s-polarized light by the half-wave ($\lambda/2$) retardation layers 135.

To better understand how the p-polarized light is converted to s-polarization and emerges from the other halves of the window exit surface 120, the portion of the incident light 145(n) light transmitted through the top half of the PBS layer 130(n) is described. Unlike the s-polarized light 150(n) reflected off the PBS coating 130(n), a p-polarized light, which is separated by the PBS coating 130(n) from the unpolarized incident light 145(n), passes through the top half of the PBS coating 130(n).

The half-wave ($\lambda/2$) retardation film 135(n) is formed over the exit side of the PBS coating 130(n), which exit side is opposite the PBS side that receives the unpolarized incident light 145(n). This $\lambda/2$ retardation film 135(n) converts the p-polarized light emerging from the exit side of the PBS 130(n) into an s-polarized light 170(n).

The newly converted s-polarized light 170(n) emerging from the top half side of the polarizing plate 105(n), which side has the PBS coating 130(n) and $\lambda/2$ retardation film 135(n) formed thereon, impinges onto the bottom half of the next PBS coating 130(n+1) of the second polarizing plate 105(n+1) which is adjacent to the first polarizing plate 105(n). This converted s-polarized light 170(n) is reflected by the bottom half of the next PBS coating 130(n+1), in a fashion similar to the original s-polarized light 150(n), to emerge from the far half of the exit surface 120(n+1) of the polarizing plate 105(n+1), in a direction 125 which is normal to the array 100.

The converted s-polarized light 170(n), which is reflected by the bottom half of the next PBS coating 130(n+1), emerges as an s-polarized light 175(n) from the second or far half of the bottom of the polarizing plate 105(n+1). Light emerges from the first or near half of the bottom of the polarizing plate 105(n+1) as follows. An unpolarized light beam 145(n+1) impinges on the entrance surface 115(n+1) of the second polarizing plate 105(n+1); and the PBS 130(n+1) separates it to s-polarized light 150(n+1), and reflects the s-polarized light 150(n+1) towards the first half of the bottom of the polarizing plate 105(n+1).

In summary, s-polarized light reflected by the top half of each PBS coating 130 of each polarizing plate 105 emerge from alternating first or near halves of the exit surface 120, while p-polarized light passing through each PBS top half is converted to s-polarization and emerges from alternating second or far halves of the exit surface 120, thus filling in the entire exit surface 120 of the window or strip-PBS array 100.

In this fashion, using unpolarized light incident at a 30° from the entrance surface 115 of the window 100, which is 60 degrees from the normal 125 to the strip-PBS array 100, emerges from the array exit surface 120 in a normal or perpendicular direction thereto.

As described, the strip-PBS array 100 produces normal incidence polarized illumination from an unpolarized light source, which may be an arc lamp with a parabolic reflector, a white light emitting diode (LED), or a thin cold cathode fluorescent light (CCFL) tube, for example. The s-polarized light 150 illuminates a polarization-based liquid crystal light valve or SLM 140, such as a reflective liquid crystal light valve for example, placed immediately below the strip-PBS array 100.

Figure 4:
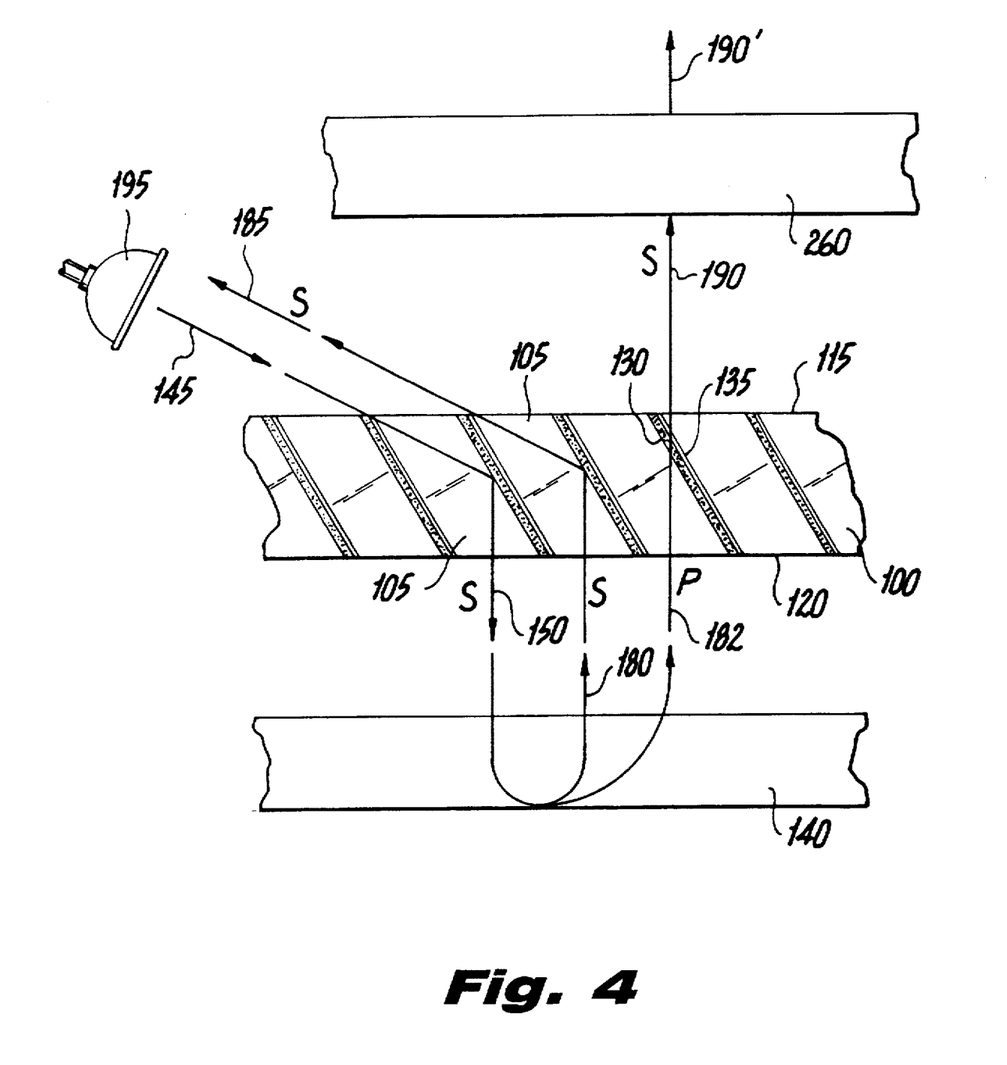
FIG. 4 shows an optical system using the strip-PBS of FIG. 1 and an absorbing clean-up polarizer according to another embodiment of the present invention.

A polarizer film or plate 260 may be included, for example, to receive the image forming light 160 from the strip-PBS array 100 and to output a cleaned-up image forming light 190'. This improves contrast of the image viewed on a screen, for example. The SLM 140 may be a reflective SLM, or a transmissive SLM. FIG. 4 shows a reflective SLM 140 that receives polarized light from the strip-PBS array 100, reflects an image forming light of p-polarization that passes through the strip-PBS array 100. The dark state s-polarized light is reflected by the strip-PBS array 100 back toward the illumination. Following the strip-PBS array 100, the absorbing clean-up polarizer 260 is used to ensure that only image-forming light is transmitted.

Illustratively, for the case where the SLM 140 is a reflective one, dark pixels result from the s-polarized light 150, which is incident on the light valve 140, being reflected without rotation to p-polarization by the light valve 140. The dark pixel s-polarized light reflected from the SLM 140 without rotation is shown as reference numeral 180. To form bright pixels of the image forming light, the reflective SLM 140 rotates the s-polarized 150 to a p-polarized image forming light 182.

Both the dark pixel s-polarized light 180 and the bright pixel p-polarized light 182, which are reflected light from the reflective SLM 140, enter the strip-PBS array 100 from the exit surface 120 at a direction substantially normal to the array 100. Within one polarizing plate 105, all the light reflected from the SLM 140 impinges onto the entire PBS coating 130 of that one polarizing plate 105. This PBS coating 130 reflects the dark pixel s-polarized light 180 along a path that retraces the unpolarized light 145 back into an illumination source 195 that provided the unpolarized light 145. The dark pixel s-polarized light reflected from the PBS coating 130 is shown as numeral 185 in FIG. 4.

The PBS coating 130 also transmits the bright pixel p-polarized light 182 which passes through the λ/2 retardation film 135 located immediately after the PBS coating 130. Upon passing through the λ/2 retardation film 135, the bright pixel p-polarized light 182 become an s-polarized image forming light 190. This rotation from p to s polarization by the half-wave retardation film 135 is an unnecessary conversion, however it does not degrade the image. The image forming light 190, now having s-polarization, continues straight through the strip-PBS 100 to emerge normal to the entrance surface 100. This s-polarized light 190 can then be used by any optical imaging system that includes, for example, the clean-up polarizer shown as numeral 260 in FIGS. 4 and 8, an imaging lens shown as numeral 270 in FIG. 8, or a projection lens shown as numeral 390 in FIG. 11.

It is essential that the incident light 145 be 60 degrees from the strip-PBS normal 125, i.e., β=60° (FIG. 1). The embodiment depicted in FIGS. 1 and 3 shows that the incident light 145 travels in air and penetrates the strip-PBS 100, which is made of glass or plastic for example. Due to optical reflection/refraction laws, such as Snell's law, it is difficult to couple light from air into glass, which has a refraction index n ranging from 1.4 to 1.6, so that light traveling in the glass strip-PBS 100, upon entry therein, travels at a 60 degree angle to the strip-PBS normal 125.

Figure 5:
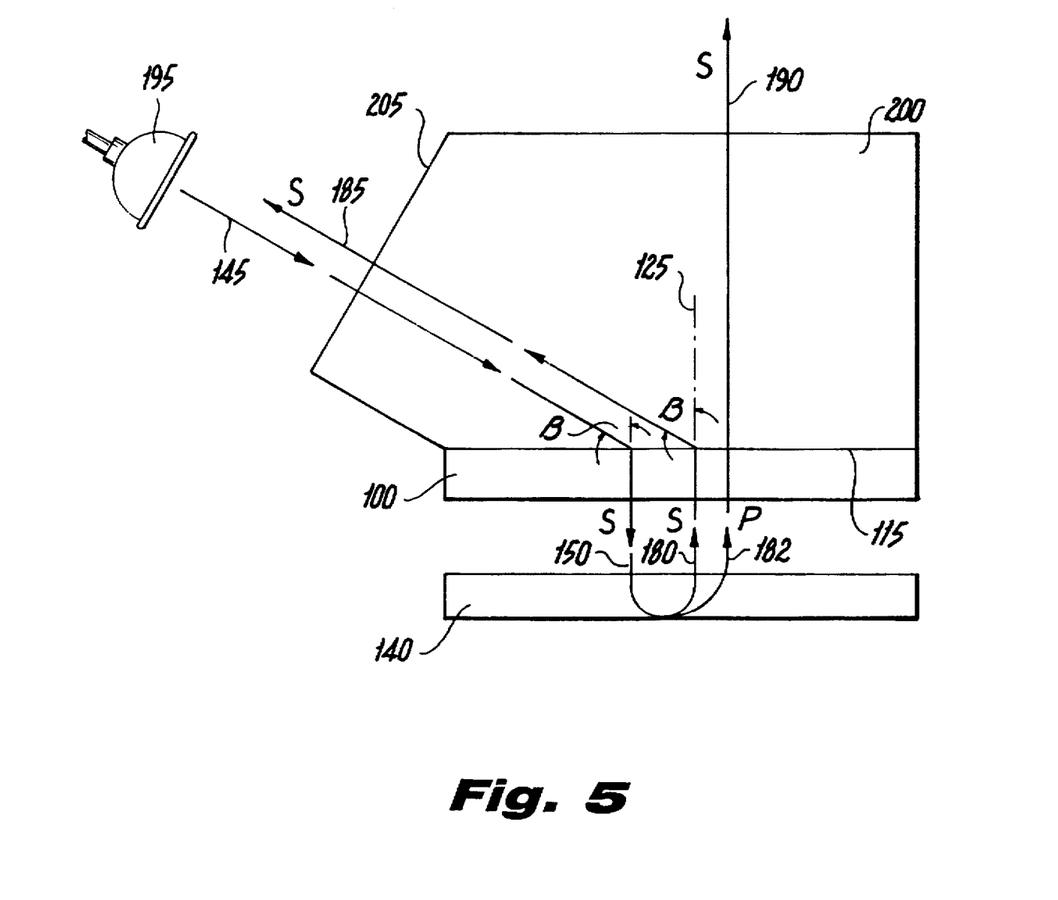
FIG. 5 shows an optical system using the strip-PBS of FIG. 1 and a reflective light valve with an unpolarized light provided at a tilted angle according to yet another embodiment of the present invention.

To ensure that the light traveling in the glass strip-PBS 100 is at 60 degrees upon entry therein, a prism is placed on the entrance surface 115 of the strip-PBS 100. FIG. 5 shows an embodiment where a prism 200 is placed over the entrance surface 115 of the strip-PBS 100. The prism 200 has an index of refraction that is similar to the refraction index of the strip-PBS 100. Illustratively, the prism 200 is made of glass or plastic material having the desired refraction index.

The shape of the prism 200 is configured to allow the incident unpolarized light 145 to enter the prism 200 at a normal incidence to a prism side surface 205 which is slanted, yet to continue toward the strip-PBS 100 at the required 60 degrees from the normal 125 to the strip-PBS 100, i.e., β=60°. Illustratively, the prism 200 is laminated to the strip-PBS 100 producing a single illumination/imaging optical unit, and is made of a plastic material to maintain low cost and light weight.

Figure 6:
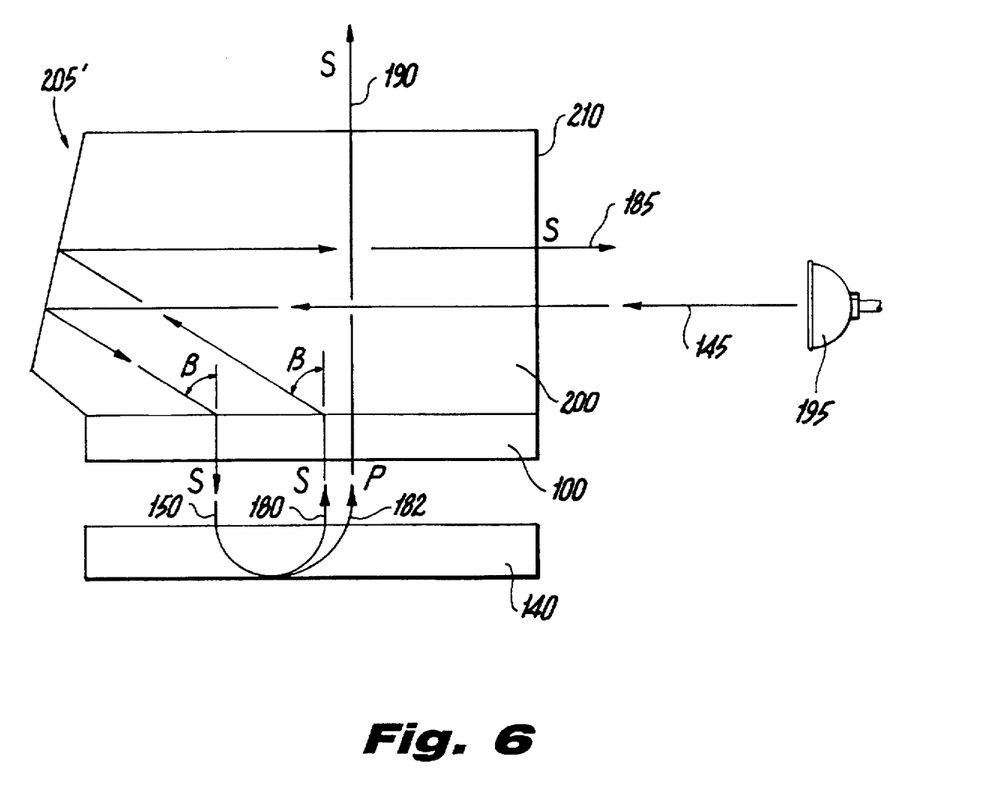
FIG. 6 shows an optical system using the strip-PBS of FIG. 1 and a reflective light valve with an unpolarized light provided at a parallel direction thereto according to a further embodiment of the present invention.

FIG. 6 shows another embodiment derived by slightly modifying the embodiment shown in FIG. 5. Compared to FIG. 5, the illumination source 195 in FIG. 6 is introduced from a vertical prism side surface 210, which is opposite the prism slanted side surface 205'. As shown in FIG. 6, the unpolarized light 145 from the light source 195 enters the vertical prism side surface 210 at a normal incidence thereto, and is parallel to the strip-PBS 100 and the light valve 140.

The unpolarized light 145 traverses across the prism 200 to its slanted side surface 205' which has a reflective mirrored surface. This prism reflective surface 205' is slanted at an angle to reflect the unpolarized light 145 and direct it to the strip-PBS array 100 at the required angle β of 60°.

Figure 7:
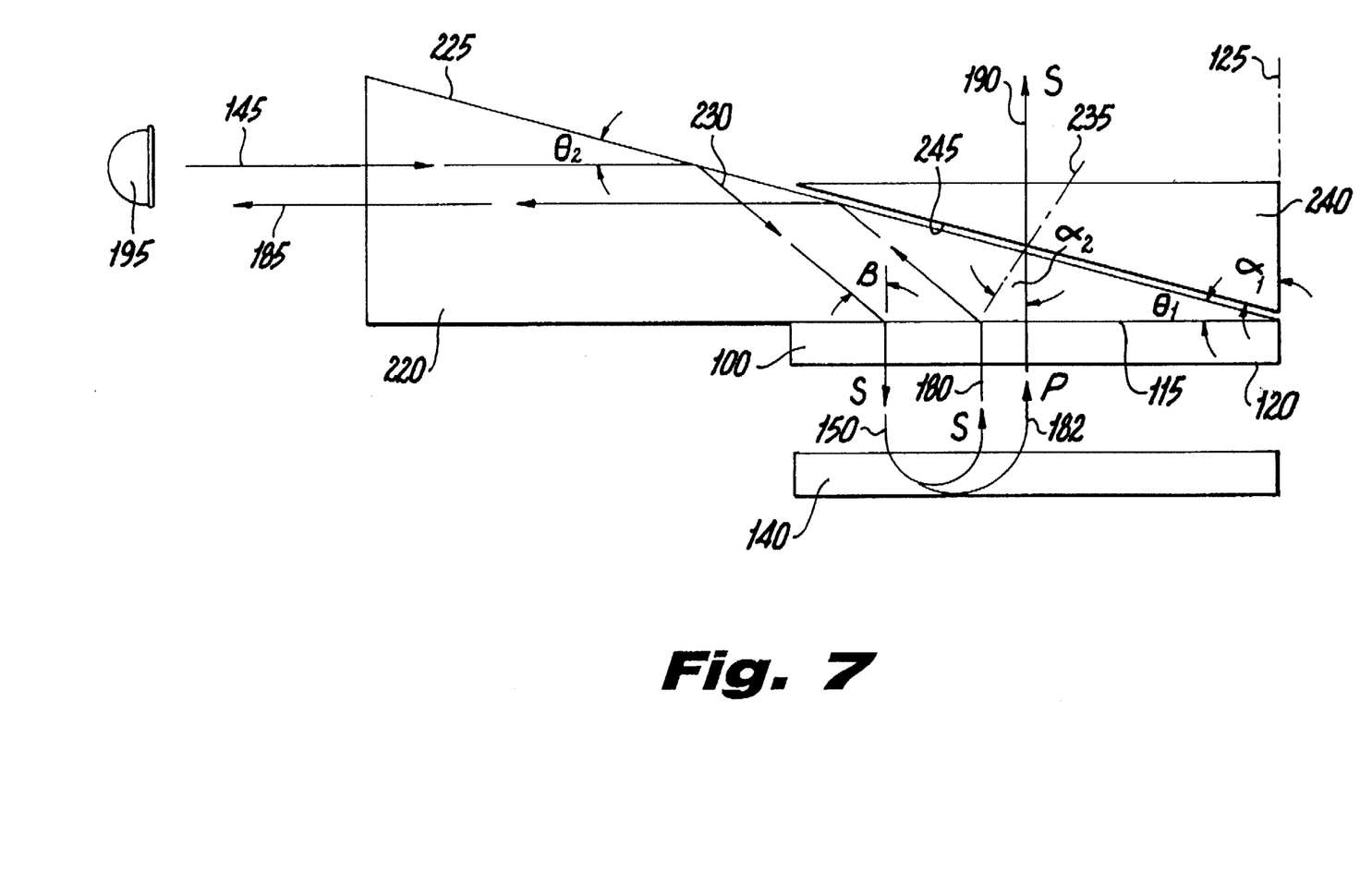
FIG. 7 shows an optical system having a reduced thickness using the strip-PBS of FIG. 1 and a reflective light valve with an unpolarized light provided at a parallel direction thereto according to yet another embodiment of the present invention.

Although the embodiments shown FIGS. 5 and 6 function properly, they are not the most compact. FIG. 7 shows a preferred embodiment where the thickness of the prism has been substantially reduced by using a prism 220 having a tilted reflective surface 225, which receives the unpolarized light 145 from the light source 195. In effect, miniaturization is achieved by adding a reflection in the incident light path.

The unpolarized light reflects off the tilted surface 225, which is tilted by angle $v_1$ equaling 75 degrees to the strip-PBS normal 125. The result is that the unpolarized light 145, which is incident parallel to the strip-PBS array 100 (or 90 degrees from its normal 125), is reflected by the 75 degree tilted surface 225 to emerge at the desired 60 degrees (β=60°). This 60 degree light reflected by the 75 degree tilted surface 225, shown as reference numeral 230 in FIG. 7, continues to impinge on the strip-PBS 100 and reflect toward the SLM 140, as described in connection with FIGS. 1–3.

Because the reflecting surface 225 is at a very shallow angle, namely substantially at an angle θ=15° where θ=90−$v_1$, the reflection can be achieved entirely by total internal reflection (TIR) within this prism 220. The difference in the refractive index between air (n=1) and the glass or plastic medium of the prism 220 (n=1.4 to 1.6) ensures total internal reflection at the shallow angle of incidence $θ_2$ onto the glass/air (or plastic/air) interface 225.

The s-polarized dark pixel light 180 reflected from the SLM 140 retraces the path of the incident light back through the TIR prism 220, similar to that described in greater detail in connection with FIGS. 4–5. The p-polarized image forming light 182 reflected by the light valve 140 continues on through the strip-PBS 100 as described in connection with FIGS. 4–5, is converted to s-polarization 190 by the λ/2 retardation film 135 (FIG. 4). This s-polarized image forming light 190 emerges normal to the strip-PBS entrance surface 115 to enter the TIR prism 220. The s-polarized image forming light 190 maintains its normal or perpendicular direction to the light valve 140 and strip-PBS 100, rather than reflect from the PBS coating 130 (FIG. 4) at the 60 degrees direction that the dark pixel s-polarized light 185 travels upon emerging from the entrance surface 115 of the strip-PBS 100.

This s-polarized image forming light 190 impinges onto the glass/air (or plastic/air) interface 225 at an angle $v_2$ of substantially 15 degrees away from the normal 235 thereto.

At this 15° angle, the s-polarized image forming light 190 exits through this interface 225 and emerges from the prism 220.

As shown in FIG. 7, a second complimentary prism 240 has a surface 245 tilted by the same angle v=75° of the tilted surface 225 of the first prism 230. This 75° tilted surface 245 of the second prism 240 complements the tilted surface 225 of the first prism 230 and is placed adjacent thereto. The two prisms 230, 240 are formed of the same material.

The two prisms 220, 240 together form a plane-parallel window allowing the image forming light to be transmitted. The tilted surfaces of the two prisms 220, 240 are separated from one another by a few microns. This separation does not effect the direct imaging path, but ensures total internal reflection for the unpolarized incident light 145 from the light source 195, as well as the dark pixel light 185 reflected from the light valve 140.

Figure 8:
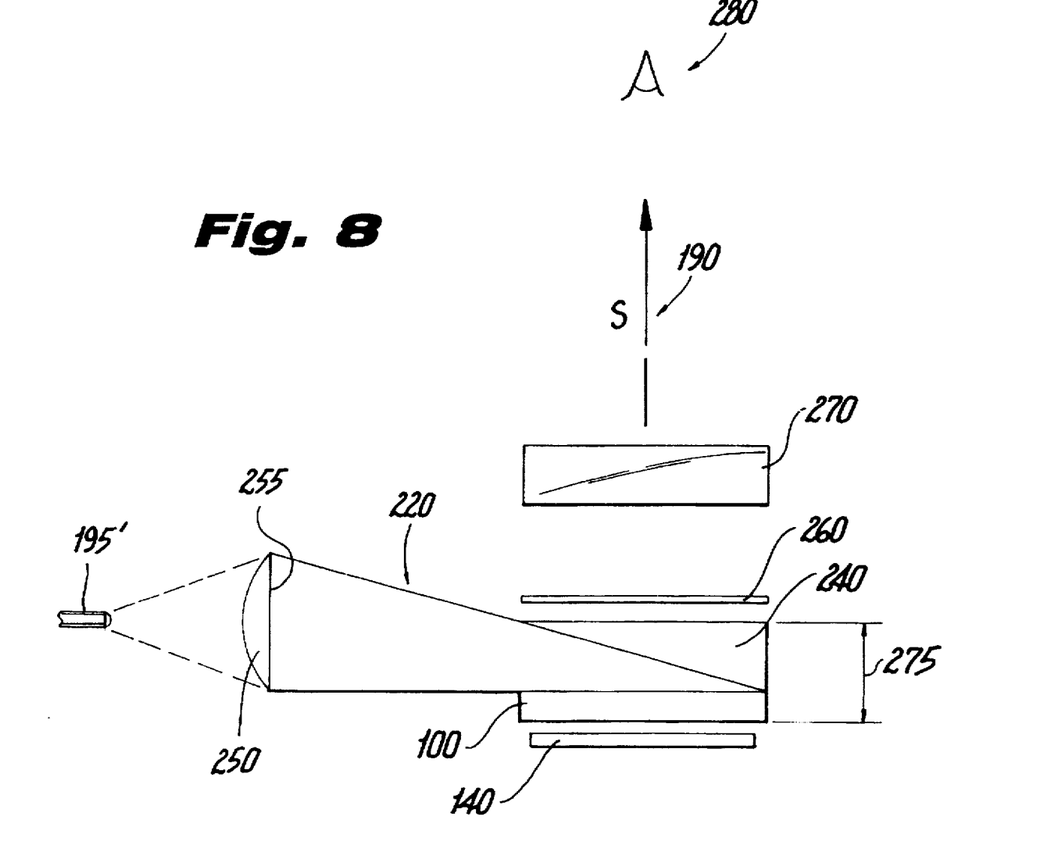
FIG. 8 shows a projection system having the optical system of FIG. 6 according to a still further embodiment of the present invention.

FIG. 8 shows an optical system where the strip-PBS 100 and tilted prisms 220, 240 are used for illumination and imaging using the reflective light valve 140. Illustratively, light from a "white" light emitting diode (LED) 195' is collimated by a lens 250, which is plastic for example. The white LED 195' includes at least three individual LED's, one red, one green and one blue, packaged closely together to mimic white a light source.

The collimated light is introduced into the plastic TIR prism 220 from its side 255 and is directed to the strip-PBS array 100 at 60 degrees from the array normal 125 shown in FIG. 7. The path of light in FIG. 8 is identical to that in FIG. 7. Accordingly, for simplicity, the path of light in FIG. 8 is not shown, and FIG. 7 is to be referred to when describing the light path.

As shown in FIGS. 7-8, the strip-PBS array 100 is laminated to the TIR prism 220. The strip-PBS array 100 polarizes and directs one polarization of the light, e.g., the s-polarization 150, in a normal direction to the light valve 140. The polarization-rotated p-polarized image forming light 182 passes through the strip-PBS array 100. AS described in connection with FIG. 3, the λ/2 retardation film 135 changes the polarization of the image forming light 182 from p-polarization to s-polarization.

The s-polarized image forming light passes through the TIR interface 225, then through the second complementary prism 240. Illustratively, a cleanup polarizing film 260 is added at the output of the second prism 240 to improve contrast. A conventional refractive imaging optics, that includes an imaging lens 270, is used in FIG. 8 to project the image of the light valve 140 to a screen (not shown), or to relay the image to the eye of a viewer 280.

The embodiment shown in FIG. 8 is compact, light weight, efficient, and low cost. In terms of compactness, the strip-PBS 100 is approximately 2 mm in thickness, for example, and the total thickness of the plastic prisms 220, 240 over the light valve 140 is less than 30% of the width of the light valve 140. For example, using a light valve with 9 mm×12 mm dimensions, the thickness 275 of the total structure that includes the strip-PBS 100 plus the TIR prisms 220, 240 is approximately 5 mm.

In addition to the conventional refractive imaging optics 270 shown in FIG. 8, a variety of optical imaging systems can then be used for imaging the light valve 140 and projecting the image onto a screen, or relaying the image to the eye of the viewer 280.

Figure 9:
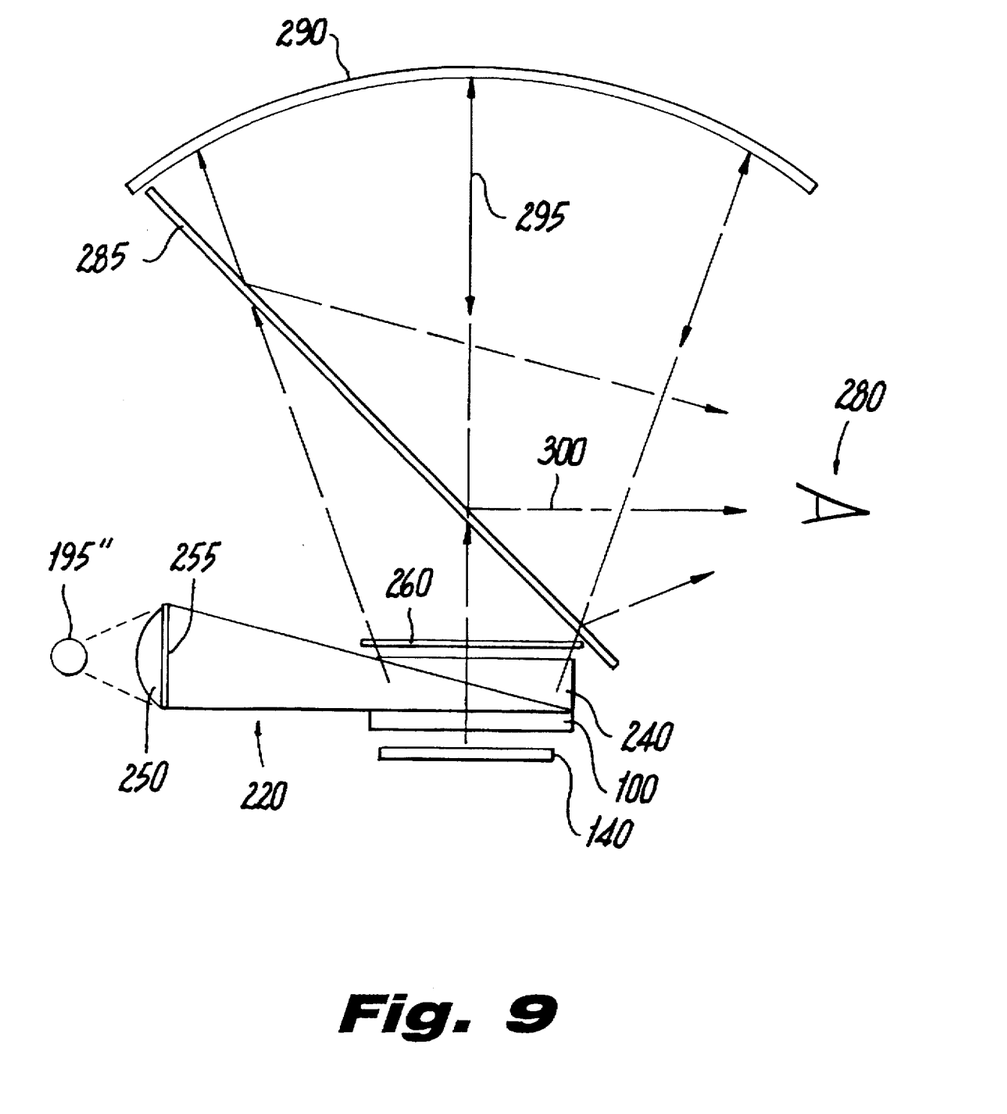
FIG. 9 shows a head mounted projection system having the optical system of FIG. 6 according to another embodiment of the present invention.

As shown in FIG. 9, one example includes a compact head mounted display. In this example, the imaging system comprises a thin 50/50 beam splitter 285 and a spherical mirror 290. The 50/50 beam splitter 285 transmits approximately 50% and reflects approximately 50% of the incident light. The 50/50 splitter 285 allows some of the light, about 25%, to be directed to the viewer 280. This 25% figure is arrived as follow. Half or 50% of the image forming light 190 reflected from the SLM 140 passes through the 50/50 splitter 285 toward the spherical mirror 290, shown as reference numeral 295 in FIG. 9. The other half (not shown) of the image forming light 190 is reflected away by the 50/50 splitter 285. The spherical mirror 290 reflects this 50% image forming light 295 back to the 50/50 splitter 285, which passes half of this 50% image forming light 295 toward the SLM 140, and reflects the other half of this 50% image forming light 295, i.e., 25% of the image forming light shown as reference numeral 300, to the viewer 280.

The spherical mirror 290 provides the necessary optical imaging properties to relay a magnified image of the light valve 140 to the viewer 280. FIG. 9 also shows an alternative light source for the illumination, namely, a thin cold cathode fluorescent light (CCFL) tube 195".

Figure 10:
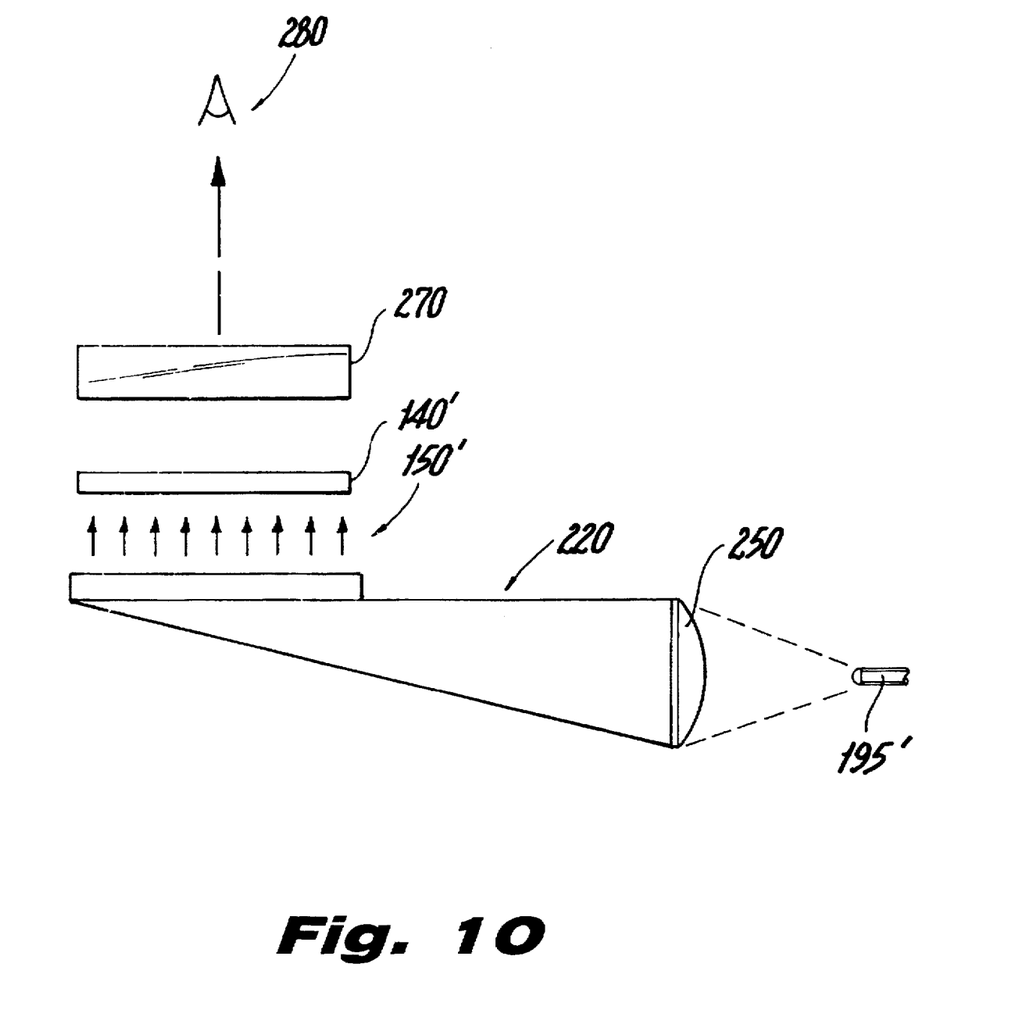
FIG. 10 shows a projection system having the strip-PBS of FIG. 1 and a transmissive light valve according to another embodiment of the present invention.

In addition to providing efficient illumination and imaging for reflective light valves, the strip PBS 100 also provides highly efficient backlighting for transmission based light valves. FIG. 10 shows an embodiment that uses the strip-PBS 100 and TIR prism 200 to illuminate a transmissive light valve 140', such as a poly-silicon transmission liquid crystal light valve. If desired, the complementary prism 240 (FIGS. 6-8) may also be included.

The embodiment using the transmissive light valve 140' does not require the imaging function of the optical structure comprising the strip-PBS 100 and TIR prism 200. Rather, only the normal incidence illumination provided by the strip-PBS 100 and TIR prism 200 is needed and used. The polarized and normal incident illumination onto the transmissive light valve 140' is shown as reference numeral 150' in FIG. 10.

One advantage of the strip-PBS 100 when used with the transmission light valve 140' is the ability to convert essentially all the collimated unpolarized light into a single polarization. This polarization conversion feature of the strip-PBS 100 doubles the optical efficiency through the transmissive liquid crystal light valve.

Figure 11:
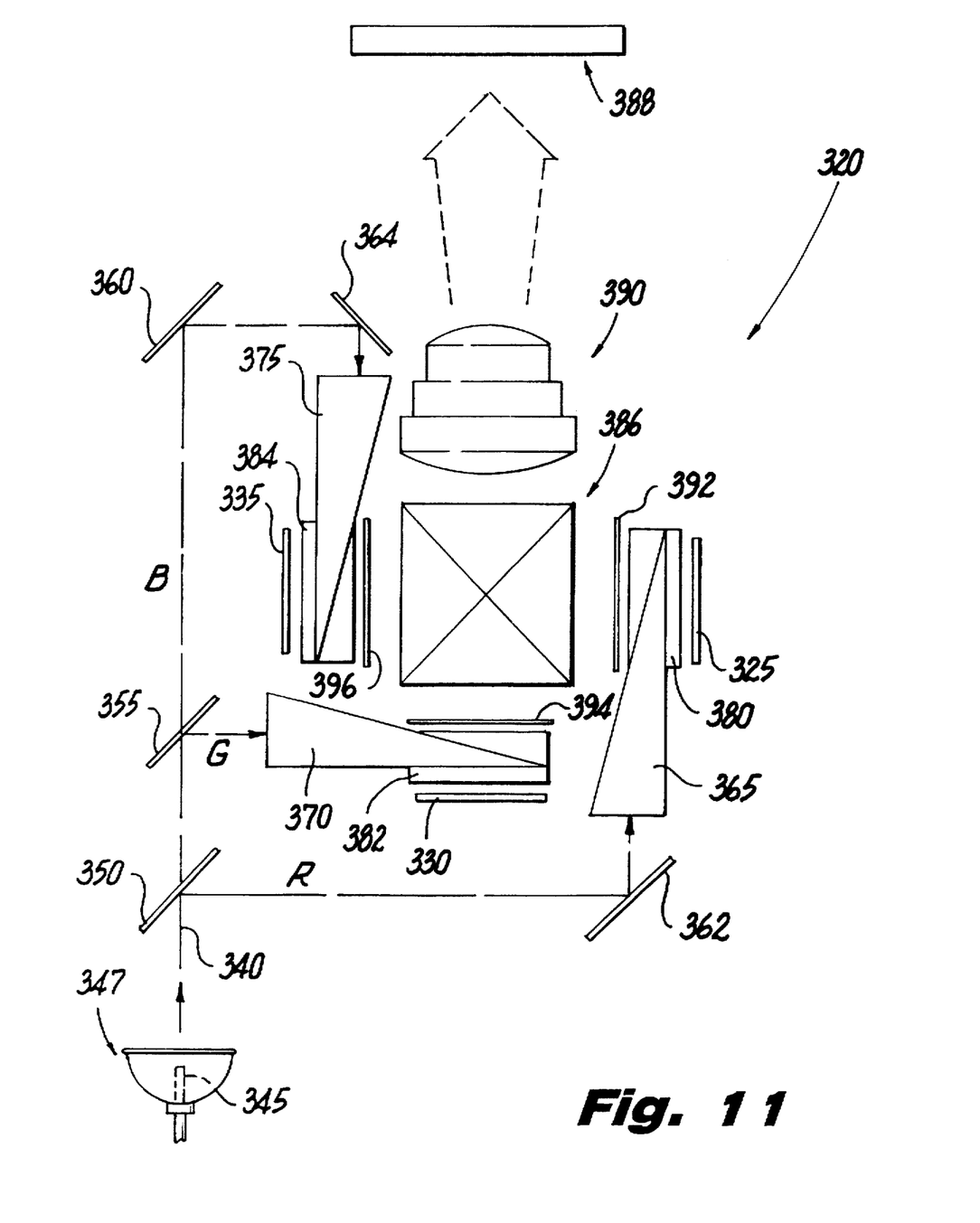
FIG. 11 shows a color projection system according to another embodiment of the present invention.

FIG. 11 schematically shows a projection optical system 320 according to another embodiment for frontlighting of three reflective light valves 325, 330, 335. Here, a collimated unpolarized light 340 from an arc lamp white light source 345 having a parabolic reflector 347, for example, is separated into three colors red (R), green (G) and blue (B) using three dichroic mirrors 350, 355, 360.

Each color is directed using mirrors as needed, such as shown as reference numeral 362, 364, to an individual illuminator/TIR prism assembly 365, 370, 375. The prism assemblies 365, 370, 375 provide a single color illumination, e.g., R, G or B, to the reflective light valves 325, 330, 340, respectively, through corresponding strip-PBSs 380, 382, 384. The image forming light reflected from each light valve 325, 330, 340 emerges from the respective strip-PBS/prism assemblies in a direction normal to the respective light valve.

The three individual color images are then recombined in a dichroic prism assembly, such as a dichroic X-cube 386. The combined full color image is then projected onto a screen 388 using a projection lens 390. Cleanup polarizers 392, 394, 396 may be placed at the three input surfaces of the X-cube 386 for contrast enhancement.

Although FIG. 11 shows the illumination/TIR prism assemblies oriented in the same plane as the X-cube assembly 386, it is also possible to rotate the illumination/TIR prism assembly by 90 degrees, for example, such that the illumination is introduced from above the X-cube assembly 386. This embodiment is achieved by rotating each of the three illumination/TIR prism assembly by 90 degrees about an axis perpendicular to the center of their respective light valves.

In summary, a thin and flat optical system is described that converts oblique angle illumination light into normal incidence illumination onto a reflective light valve. The optical system also allows an image forming light reflected from a reflective SLM to pass through the thin and flat structure of the strip-PBS array to provide optical imaging of the light valve or SLM also at normal incidence.

In addition, the optical system is highly efficient since substantially all the light is converted from an unpolarized source (such as fluorescent light tubes, lasers, light emitting diodes, arc lamps) into polarized illumination. That is, the optical system converts unpolarized light into a light having one polarization without a significant conversion loss, thus avoiding a typical 50% loss associated with conventional polarizers that convert unpolarized light to 50% p-polarized light and/or 50% s-polarized light.

The optical system relies on polarization control of the light through the use of polarization controlling elements arranged as an array of strips. Each strip includes polarizing multi-layer optical coatings and half-wave optical retardation films.

The polarization controlling elements also provide the function of a polarizing beam splitter (PBS) cube used in conventional optical systems, namely, to separate the image forming light, whose polarization has been rotated by the light valve, from the background unrotated light.

The optical system is well suited for illuminating a reflective light valve based on polarized light, such as a typical liquid crystal light valve. One typical application is illuminating and imaging miniature high resolution liquid crystal displays based on crystalline silicon circuit technology. In addition, the inventive illumination system allows fabrication of compact, lightweight, and efficient optical systems using the reflective c-silicon light valves for portable personal displays, such as head mounted displays.

The optical system can also be used as an efficient and compact backlight source for miniature transmission-type displays, such as liquid crystal poly-silicon light valves. In this application, the optical system provides highly efficient polarized light illumination, but does not require imaging through the structure.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. An optical device comprising an array of polarizing plates, each one of said polarizing plates having opposing surfaces that are tilted relative to entrance and exit surfaces of said one polarizing plate, and including:
   a polarizing layer formed on one of said opposing tilted surfaces; and
   a half-wave optical retardation layer formed on said polarizing layer;
   said array of polarizing plates converting unpolarized light, which is incident on said entrance surface at an oblique angle from a normal to said entrance surface, to a polarized light having a first polarization and exiting approximately perpendicular to said exit surface.

2. The optical device of claim 1, wherein said array of polarizing plates is transparent to a light having a second polarization.

3. The optical device of claim 1, wherein a top half of said polarizing layer reflects said polarized light having said first polarization to exit from a first half of said exit surface of said one polarizing plate, and passes a light having a second polarization toward another polarizing plate adjacent to said one polarizing plate, said half-wave optical retardation layer of said one polarizing plate changing said second polarization to said first polarization, wherein said changed first polarization of light reflects from a bottom half of a polarizing layer of said other polarizing plate to exit from a second half of an exit surface of said other polarizing plate.

4. The optical device of claim 1, wherein a tilt angle between an axis, which is perpendicular to said entrance and exit surfaces, and said opposing surface is substantially 30 degrees, and said oblique angle is substantially 60 degrees.

5. The optical device of claim 1, wherein a length of said tilted surface is substantially twice a length of said exit surface.

6. The optical device of claim 1, wherein a cross-section of said polarizing plate is a parallelogram.

7. The optical device of claim 1, wherein a distance between said entrance and exit surfaces is approximately 2 mm.

8. The optical device of claim 1, wherein an area of said array of polarizing plates matches an area of a light valve.

9. The optical device of claim 1 further comprising a spatial light modulator that rotates said polarized light into an image forming light.

10. The optical device of claim 9, wherein said spatial light modulator is one of a transmissive and a reflective spatial light modulator.

11. The optical device of claim 9 further comprising a polarizer that receives said image forming light and outputs a cleaned-up image forming light for improving contrast.

12. The optical device of claim 9 further comprising an imaging lens that images said image forming light for viewing.

13. The optical device of claim 1 further comprising a light source for providing said unpolarized light.

14. The optical device of claim 13, wherein said light source is one of an arc lamp, a white light emitting diode, and a cold cathode fluorescent light tube.

15. The optical device of claim 1 further comprising a collimating lens, which is located between a light source and said entrance surface, to collimate said unpolarized light incident on said entrance surface.

16. The optical device of claim 1, further comprising:
   a light valve which receives said polarized light from said exit surface and provides an image forming light;
   a beam splitter that passes one portion of said image forming light and reflects another portion thereof;
   a mirror that reflects said one portion of said image forming light passed by said beam splitter back to said beam splitter, said beam splitter reflecting a portion of the light received from said mirror toward a viewer.

17. The optical device of claim 1 further comprising:
   a plurality of said array of polarizing plates, each receiving a different color component of said unpolarized light and providing a different color component of a polarized light;
   a plurality of light valves each forming a different color image forming light from a respective one of said different color components of said polarized light; and a dichroic prism which recombines said different color components of said image forming light.

18. The optical device of claim 17 further comprising a projection lens which projects said combined image forming light onto a screen.

19. The optical device of claim 17 further comprising a plurality of dichroic mirrors which separate a white unpolarized light into said different color components of said unpolarized light.

20. The optical device of claim 1 further comprising a prism located over said entrance surface, wherein a refraction index of said prism is substantially equal to a refraction index of said polarizing plates.

21. The optical device of claim 20, wherein said prism has a surface that receives said unpolarized light at a normal direction thereto, said unpolarized light continuing to said entrance surface for incidence thereon at said oblique angle.

22. The optical device of claim 20, wherein said prism has a surface that receives said unpolarized illumination at a normal direction thereto, which is parallel to said entrance surface, and a tilted surface that reflects said unpolarized illumination to provide said unpolarized light to said entrance surface for incidence thereon at said oblique angle.

23. The optical device of claim 22, wherein a tilt angle between said prism tilted surface and said entrance surface allows total internal reflection of said unpolarized illumination to provide said unpolarized light to said entrance surface for incidence thereon at said oblique angle.

24. The optical device of claim 23 further comprising a complementary prism having a tilted surface that complements and is located over said prism tilted surface.

25. The optical device of claim 23 further comprising a reflective light valve that receives and selectively rotates said polarized light to form an image forming light, said reflective light valve reflecting said image forming light and a dark pixel light, said tilted surface allowing total internal reflection of said dark pixel light in a direction opposite and parallel to said unpolarized illumination.

26. A display comprising:
   an illumination source which provides unpolarized light;
   an array of polarizing plates having an entrance surface, which receives said unpolarized light at an oblique angle, and an exit surface which provides a polarized light having a first polarization and exiting said array at a substantially perpendicular direction to said exit surface;
   a light valve for selectively rotating said polarized light to form an image forming light; and
   an imaging lens for receiving said image forming light to form an image.

27. A frontlighting device for a reflective light valve comprising an array of polarizing plates, each one of said polarizing plates having opposing surfaces that are tilted relative to entrance and exit surfaces of said one polarizing plate, and including:
   a polarizing layer formed on one of said opposing tilted surfaces; and
   a half-wave optical retardation layer formed on said polarizing layer;
   said array of polarizing plates converting unpolarized light, which is incident on said entrance surface at an oblique angle from a normal to said entrance surface, to a polarized light having a first polarization and exiting approximately perpendicular to said exit surface for illuminating said reflective light valve.

* * * * *